3,322,819
HYDRODIMERIZATION OF METHACRYLIC ACID ESTERS

Ralph C. Schreyer, Wilmington, Del., assignor to E. I. du Pont de Nemours and Company, Wilmington, Del., a corporation of Delaware
No Drawing. Filed May 21, 1963, Ser. No. 282,165
7 Claims. (Cl. 260—485)

This invention relates to the preparation of 2,2,′ trimethylglutaric acid esters from methacrylic acid ester.

While in the past dicarboxylic acid esters have been prepared by the uncatalyzed thermal dimerization of unsaturated monocarboxylic acid esters, the products formed by such processes are unsaturated, and the joining of the two molecules takes place at the terminal carbon atoms opposite the carboxylate group (C. J. Albisetti, et al., J. Am. Chem. Soc., 78, 472–475 (1956)). Thus the dimerization processes of the prior art are not applicable when it is desired to join a non-terminal carbon atom of one molecule with a terminal carbon atom of a second molecule to provide more branching in the resulting chain, and when concurrent reduction is desired.

I now have found that methacrylic acid esters can be hydrodimerized, i.e., dimerized and reduced, to form 2, 2,4-trimethylglutaric acid esters by contacting the unsaturated ester with (a) cobalt carbonyl hydride or ruthenium carbonyl and (b) water, in the presence of carbon monoxide at a pressure of at least about 1000 p.s.i. ga. and at a temperature within the range of about 130° C. to about 300° C.

The cobalt carbonyl hydride, $HCo(CO)_4$, or ruthenium carbonyl, $Ru(CO)_5$, can be prepared outside of the reactor in which the present process is to be carried out, or it can be prepared in situ either prior to being contacted with the methacrylate under the conditions employed in the present process, or while the reaction conditions prevail in the reactor. Whether prepared outside of the reactor or in situ, care must be taken to stabilize the cobalt carbonyl hydride or ruthenium carbonyl as formed, and for this reason the carbonyl compound should be kept in contact with carbon monoxide under a pressure of at least about 1000 p.s.i. ga. when at reaction temperatures.

The method used to prepare the cobalt carbonyl hydride or the ruthenium carbonyl has no critical effect on the present process. Any of the known methods can be used. For example, to prepare cobalt carbonyl hydride, one can react cobalt or a cobalt salt such as cobalt sulfide, acetate, or halide with carbon monoxide and hydrogen or water, or one can react cobalt carbonyl with hydrogen or water, preferably under pressure. To prepare ruthenium carbonyl, one can react ruthenium, ruthenium oxide, or a ruthenium salt, such as a halide, sulfate, or acetate, with carbon monoxide under pressure. If the free metal is employed, it should be in a finely divided active state (e.g., prepared by reduction of the oxide). A catalyst for carbonyl formation, such as iodine, sulfur, or a compound thereof, is sometimes used. When a cobalt or ruthenium salt is employed, a free metal such as copper is useful as an acceptor for the nonmetal.

For reasons of convenience, it is preferred that in the present process the cobalt carbonyl hydride or ruthenium carbonyl be prepared in situ, either prior to the attainment of the conditions employed in the present process, or while the reaction conditions prevail in the reactor. Thus, one may charge cobalt carbonyl, $Co_2(CO)_8$, to the reactor instead of cobalt carbonyl hydride, and the latter can then be formed in situ (1) by reaction of the carbonyl with hydrogen or water prior to the attainment of the reaction conditions to be employed for the hydrodimerization, or (2) by reaction of the carbonyl with water while the hydrodimerization reaction conditions prevail. In another manner, one can charge cobalt, a cobalt salt, ruthenium, ruthenium oxide, or a ruthenium salt to the reactor and contact it with carbon monoxide at a pressure of at least about 2000 p.s.i. ga. to form cobalt or ruthenium carbonyl in situ. For the formation of cobalt carbonyl hydride or cobalt or ruthenium carbonyl, temperatures of 100–200° C. and pressures of 1000–3000 p.s.i. ga. generally are employed, the particular conditions used depending on the starting materials. The reaction conditions employed in the present process thus are adequate for in situ formation of the carbonyl compound.

The pressure of the carbon monoxide used in the present process depends on various factors, particularly on whether or not the gas is required to form cobalt carbonyl hydride or cobalt or ruthenium carbonyl in situ. If cobalt carbonyl, cobalt carbonyl hydride, or ruthenium carbonyl is charged to the reactor, carbon monoxide under a pressure of at least about 1000 p.s.i. ga. is sufficient to stabilize these compounds at the reaction temperature. On the other hand, if the carbonyl compounds are to be prepared in situ by a reaction involving carbon monoxide, the reactor generally will be pressurized with carbon monoxide at a pressure of at least about 2000 p.s.i. ga., and preferably at least about 3000 p.s.i. ga. to assure reaction of the carbon monoxide with either cobalt, a cobalt salt, ruthenium, ruthenium oxide, or a ruthenium salt. Pressures of about 5000–6000 p.s.i. ga. show particular benefit with respect to reaction rate. Higher pressures, e.g., pressures up to about 15,000 p.s.i. ga., are operable, but appear to offer no advantage.

The process of this invention is effected at a temperature within the range of about 130° C. to about 300° C. Preferably, a temperature in the range of about 160° C. to about 200° C. is used. Temperatures below about 130° C. are insufficient to bring about reaction of the methacrylate at a practical rate. Temperatures above about 300° C. are undesirable since side reactions tend to occur.

While the mechanism of the reaction which takes place in the present process is not known with certainty, it appears that both water and cobalt carbonyl hydride or ruthenium carbonyl are required to achieve the desired hydrodimerization. Since cobalt carbonyl reacts with water to form cobalt carbonyl hydride, cobalt carbonyl may be substituted for the hydride as a starting material provided the amount of water present is in excess of the amount required to form the hydride. Preferably, at least one-half mole of water should be present per mole of methacrylate. Larger quantities of water can be used but the amount should not be so large as to destroy the homogeneity of the reaction mixture. In general the amount of water used should not exceed an amount which provides a water/methacrylate molar ratio higher than about 30/1. The ruthenium or cobalt carbonyl, or cobalt carbonyl hydride need be present only in catalytic amounts, e.g., from about 0.01 mole to about 0.25–0.50 mole per mole of methacrylic acid ester.

No solvent is required in the present process. However, to provide a homogeneous reaction system and therefore better contact of the methacrylate with the carbonyl compound, it is preferable that a water-miscible inert solvent for the methacrylate and carbonyl compound be used. Generally, the use of a solvent results in improved yields. Typical of the solvents which may be used are, for example, acetone, dioxan, and tetrahydrofuran.

Agitation of the reactants is desirable for better contact thereof.

While the time period during which the methacrylic acid ester is in contact with the carbonyl compound may vary depending on the temperature used, generally reaction times of 0.25 to 2 hours are required.

The particular methacrylic acid ester used as the starting material in the present process is not critical to the invention. For reasons of availability and economy, however, alkyl esters, such as methyl, ethyl, propyl, and butyl methacrylates, will be used.

Esters of 2,2,4-trimethylglutaric acid are of interest as intermediates to hindered carboxylic acids for polyesters and polyamides, the presence of the methyl groups on the glutaric acid chain lowering the melting point of the resulting polymers to a desirable range.

The following examples serve to illustrate specific embodiments of the method of carrying out the process of the present invention. However, they will be understood as being illustrative only and not as limiting the invention in any manner.

*Example 1*

Twenty-five milliliters of methyl methacrylate, 125 milliliters of acetone, 18 milliliters of water, 5 grams of reduced cobalt oxide, and 0.5 gram of iodine were charged to an agitated, stainless steel autoclave. Carbon monoxide was introduced into the autoclave under an initial pressure of 6000 p.s.i. ga., and the mixture was heated at 175° C. for two hours. Upon distillation, the reaction mixture gave 9 milliliters of unreacted methyl methacrylate and 5 grams of a liquid boiling at 100–105° C. at 13–17 mm. The infrared spectrum of this liquid revealed carbonyl bands and no olefinic double bonds. Two runs were made under these conditions and the products combined. Redistillation gave a plateau at 100–102° C. at 10 mm.

Calcd. for $C_{10}H_{18}O_4$: C, 59.41; H, 8.91; sap. eq. 101. Found: C, 59.16, 59.17; H, 8.72, 8.59; sap. eq. 102, 102.

The liquid was identified as dimethyl 2,2,4-trimethylglutarate by hydrolysis to the corresponding acid. The melting point of the latter was the same as the reported value for 2,2,4-trimethylglutaric acid (96–97° C.).

*Example 2*

Thirty milliliters of methyl methacrylate, 125 milliliters of acetone, 18 milliliters of water, 0.6 gram of ruthenium trichloride, and 0.1 gram of iodine were charged to a stainless steel shaker-tube reactor.

Carbon monoxide was introduced into the reactor under an initial pressure of 6000 p.s.i. ga., and the mixture was heated at 175° for two hours. The product was distilled to give water, acetone, and 6.4 grams of a liquid boiling at 50–75° C. at 3 mm. Vapor phase chromatographic analysis revealed >95% of one compound. The infrared spectrum of the liquid from the major peak was identical with that of the product prepared as described in Example 1.

*Example 3*

The procedure described in Example 1 was repeated twice with the exception that 30 milliliters of butyl methacrylate was substituted for the methyl methacrylate. The products from the two runs were combined and distilled to give water, acetone, and 11 grams of a liquid boiling at 120–142° C. at 1–2 mm. Redistillation gave a plateau at 148–152° C. at 6 mm.

Calcd. for $C_{16}H_{30}O_4$: C, 67.13; H, 10.49. Found: C, 66.81, 67.00; H, 10.32, 10.40.

Infrared and nuclear magnetic resonance spectra confirmed that the compound was dibutyl 2,2,4-trimethylglutarate.

The invention has been described in detail in the foregoing. However, it will be apparent to those skilled in the art that many variations are possible without departure from the scope of the invention. I intend, therefore, to be limited only by the following claims.

I claim:
1. A process with comprises contacting a methacrylic acid ester with 0.5 to 30 moles of water per mole of acid ester and a catalytic amount of a carbonyl compound selected from the group consisting of cobalt carbonyl hydride and ruthenium carbonyl, in the presence of carbon monoxide at a pressure of at least about 1000 p.s.i. ga. and at a temperature within the range of about 130° C. to about 300° C. and recovering the corresponding diester of 2,2,4-trimethylglutaric acid thus obtained from the reaction mixture.

2. A process according to claim 1, wherein said cobalt carbonyl hydride is prepared in situ from cobalt carbonyl by reaction with said water.

3. A process according to claim 1, wherein the carbonyl compound is formed in situ and the carbon monoxide is at a pressure of at least about 2000 p.s.i. ga.

4. A process according to claim 1, wherein said methacrylic acid ester is in solution in an inert water-miscible solvent.

5. A process according to claim 1, wherein said methacrylic acid ester is an alkyl ester containing 1–4 carbon atoms in the alkyl group of the ester radical.

6. A process comprising contacting at a temperature of about from 160 to 200° C., (a) a 1–4 carbon alkyl methacrylate, (b) carbon monoxide at a pressure of at least about 3000 p.s.i. ga., (c) 0.5 to 30 moles of water per mole of methacrylate, and (d) a catalyst precursor of the group consisting of cobalt, cobalt salts, ruthenium, ruthenium oxide and ruthenium salts, said salts being selected from the group consisting of sulfides, acetates and halides, and recovering the corresponding dialkyl 2,2,4-trimethylglutarate thus obtained from the reaction mixture, the catalyst precursor being present in an amount sufficient to form in situ about from 0.01 to 0.50 mole of the corresponding metal carbonyl per mole of methacrylate.

7. A hydrodimerization process for preparing a dialkyl 2,2,4-trimethylglutarate, wherein each said alkyl is of 1 to 4 carbons, from the corresponding alkyl methacrylate, which comprises contacting, at a temperature of about from 160 to 200° C., (a) the methacrylate in solution in an inert, water-miscible solvent, (b) carbon monoxide at a pressure of at least about 1000 p.s.i. ga., (c) 0.5 to 30 moles of water per mole of methacrylate, and (d) 0.01 to 0.50 mole per mole of methacrylate of a catalyst selected from the group consisting of cobalt carbonyl hydride and ruthenium carbonyl, and recovering the said glutarate thus obtained from the reaction mixture.

References Cited

UNITED STATES PATENTS

| | | | |
|---|---|---|---|
| 2,739,169 | 3/1956 | Hagemeyer | 260—537 |
| 2,871,262 | 1/1959 | Benson | 260—537 |
| 3,040,090 | 6/1962 | Alderson et al. | 260—485 |

LORRAINE A. WEINBERGER, *Primary Examiner.*

RICHARD K. JACKSON, *Examiner.*

I. R. PELLMAN, *Assistant Examiner.*

UNITED STATES PATENT OFFICE
CERTIFICATE OF CORRECTION

Patent No. 3,322,819            May 30, 1967

Ralph C. Schreyer

It is certified that error appears in the above identified patent and that said Letters Patent are hereby corrected as shown below:

Column 4, lines 10 and 11, cancel "per mole of water".

Signed and sealed this 3rd day of February 1970.

(SEAL)
Attest:

Edward M. Fletcher, Jr.            WILLIAM E. SCHUYLER, JR.
Attesting Officer            Commissioner of Patents